United States Patent [19]

Aziz

[11] Patent Number: 5,325,362
[45] Date of Patent: Jun. 28, 1994

[54] SCALABLE AND EFFICIENT INTRA-DOMAIN TUNNELING MOBILE-IP SCHEME

[75] Inventor: Ashar Aziz, Fremont, Calif.

[73] Assignee: Sun Microsystems, Inc., Mountain View, Calif.

[21] Appl. No.: 128,838

[22] Filed: Sep. 29, 1993

[51] Int. Cl.$^5$ .............................................. H04L 12/56
[52] U.S. Cl. ................................... 370/94.3; 370/95.1; 379/60
[58] Field of Search .................. 370/94.1, 94.3, 85.13, 370/85.14, 95.1; 379/60; 455/33.2

[56] References Cited

U.S. PATENT DOCUMENTS

| | | | |
|---|---|---|---|
| 4,989,204 | 1/1991 | Shimizu et al. | 370/94.1 |
| 5,159,592 | 10/1992 | Perkins | 370/95.1 |
| 5,181,200 | 1/1993 | Harrison | 370/95.1 |
| 5,276,680 | 1/1994 | Messenger | 379/60 |

OTHER PUBLICATIONS

Pravin Bhagwat and Charles E. Perkins, A Mobile Networking System Based on Internet Protocol(IP).
John Ioannidis, Dan Duchamp, Gerald Q. Macguire, Jr., IP-based Protocols for Mobile Internetworking. In proceedings of ACM SIGCOMM, pp. 235-245, 1991.

*Primary Examiner*—Wellington Chin
*Assistant Examiner*—Min Jung
*Attorney, Agent, or Firm*—Blakely Sokoloff Taylor & Zafman

[57] ABSTRACT

The present invention provides an improved method and apparatus for internetwork communication between fixed host and mobile host data processing devices. A home network includes at least one mobility support border router (MSBR) coupled between the home network and a OSPF backbone network. A new area network also includes at least one MSBR coupled between the new area and the OSPF backbone network. A third network, referred to as an "other area" network includes an MSBR coupled between the other area network and the OSPF backbone. A mobile host (MH) data processing device may move between the three networks and continue to communicate with all other fixed and mobile data processing devices coupled to the networks. In one embodiment, a first data processing (DP) device coupled to the home network may send a data packet to a MH data processing device which is normally associated with the home network, but has moved to, for example, the new area network. The data packet is sent by the first DP device to a mobility support router (MSR) located closest to the first DP device. The MSR initiates a local search to determine if the MH is currently coupled to the home area network, and if so, the MSR sends the data packet to the MH in the home area. If the MH is not coupled to the home area network, the MSBR acknowledges that the MH is out of the area and checks an internal tunnel route table for the last area (network) the MH was located in. The MSBR then send the data packet to an MSBR coupled to the new area in which the MH is now disposed, and the new area MSBR forwards the data packet to a new area MSR. The new area MSR then forwards the data packet to the MH. Any movement of the MH within the new area is detected by the new area MSBR, such that any messages sent from a new area DP device to the MH are simply forwarded to the closest MSR in the new area network and need not be sent to the MSBR of the home area, thereby optimizing routing. Additional features and methods are provided to permit the MH to move between all interconnected networks while maximizing routing efficiency.

18 Claims, 12 Drawing Sheets

SCALABLE AND EFFICIENT INTRA-DOMAIN TUNNELING MOBILE-IP SCHEME

BACKGROUND OF THE INVENTION

1. Field of the Invention

The present invention relates to the field of Internet working protocols (IP), and more particularly, the present invention relates to a mobile networking system which permits the tracking and location of mobile hosts (MH) utilizing an Internet protocol.

2. Art Background

Historically, computers coupled to a network were located at fixed positions on the network and not easily moved to new locations. The relocation of a fixed host computer required shutting the host system down and physically moving the system to another location on the network. The relocated host computer was then rebooted and reconfigured for its new network location. The advent of portable computers with the power of traditional desktop workstations has made it possible to easily relocate the host portables from one network to another. However, the ease of movement of the portable machine across networks has resulted in problems in tracking and locating the mobile machine over the networks. For example, if a user of a portable laptop workstation carries his machine from a network in Palo Alto, Calif. to Bangkok, Thailand, the network in Bangkok must be made aware that the mobile host is now coupled to its network, and the Palo Alto network must also be programmed to send any messages ("IP packets") intended for the mobile host to the Bangkok network.

A number of proposals have been made to add mobile IP nodes to existing fixed node IP networks (See for example, John Ioannidis, Dan Duchamp, Gerald Q. Maguire, Jr., "*IP-based Protocols For Mobile Internetworking*", Proceedings of the SIGCOMM'91 Conference: Communication Architectures & Protocols, pp. 235-245, ACM, September 1991 (herein referred to as the "Columbia" scheme); Fumio Teraoka, Yasuhiko Yokote, Mario Tokoro, "*A Network Architecture Providing Host Migration Transparency*", Proceedings of the SIGCOMM'91 Conference: Communication Architectures and Protocols, pp. 209-220, ACM, September 1991 (herein referred to as "Teraoka"); C. Perkins, Yakov Rekhter, "*Use Of IP Loose Source Routing For Mobile Hosts*", Draft RFC (herein referred to as "Perkins").

The "Columbia" scheme is based on IP-in-IP encapsulation concept ("tunneling") which avoids the problems related to IP options (See for example, Teraoka and Perkins). The Columbia scheme works efficiently for small campus environments and intra-campus mobility. However, as will be described, Columbia reverts to highly sub-optimal routes in case of inter-campus mobility. The present invention discloses methods by which the Columbia scheme can be extended to provide more optimal routes in case of inter-campus mobility, which is redefined herein to mean "wide-area" mobility.

The present invention is inspired by hierarchical fixed node routing, as defined in OSPF. (See for example, J. Moy, "OSPF Version 2", Internet RFC 1248, July, 1991.) One difference between the present invention and hierarchical schemes employed for fixed-node routing (such as OSPF) is that mobility route update information is not flooded on unnecessary routes. Rather, in accordance with the present invention, mobility route update information is back-propagated on active communication paths. This serves to minimize the load on the network due to control information. A two-level tunneling scheme is employed by the present invention to deliver IP packets to the wide-area mobile host. By envisioning special mobility support functionality in routing entities at the boundaries of the hierarchy, much more efficient routes are achieved to wide-area mobile nodes.

In the Columbia scheme, special routers, termed Mobility Support Routers (MSRs) manage the tracking of mobile nodes and provide for the delivery of IP packets to these mobile nodes. Mobile nodes reside on special IP "subnets", such that data packets intended for that subnet end up being routed through an MSR. (MSRs advertise themselves to the networks as being directly attached to this special "subnet"). When an MSR receives a packet for a mobile node whose location it does not know, it multicasts out a WHO_HAS request to all MSRs in its campus. (The term "campus" is not well defined from a routing perspective in the Columbia scheme. By default, it is the set of MSRs that cooperate in a certain manner.) A mobile node is always attached directly through one of the MSRs in the network. When this MSR receives the WHO_HAS request, it responds with an I_HAVE packet, stating in effect that it is serving that MH. The requesting MSR, upon learning of the present location of the MH, encapsulates IP packets intended for the MH within IP packets intended for the responding MSR. This MSR then decapsulates the packets and directly delivers them to the MH, since it is directly attached to the MH, in case the MH is still within its Home campus network.

Moreover, in the Columbia scheme, in case of inter-campus mobility (called a POPUP scenario), a specially designated MSR in the MH's Home Area serves to capture packets intended for that MH. All packets intended for that MH from other campuses and even from the campus where the MH is presently in, are routed through the designated MSR. It has been found that this aspect of the Columbia scheme can lead to highly sub-optimal routes. Assume for example that a Stationary Host (SH device) desires to send IP data packets to an MH which has roamed to a subnet one subnetwork ("hop") away from this SH, and the MH's Home campus is across the country. Packets intended for this MH will be sent to the MH's Home campus network and tunneled back across the country to the campus where the MH is located. This process results in two cross-country packet traversals, where the ideal route is just one hop in length and does not require using a wide-area link.

As will be described, the present invention provides a method for intra-domain tunneling in a mobile IP scheme which is more efficient than the Columbia or other prior systems.

SUMMARY OF THE INVENTION

The present invention provides an improved method and apparatus for internetwork communication between fixed host and mobile host data processing devices. A Home network includes at least one mobility support border router (MSBR) coupled between the Home network and a OSPF Backbone network. A New Area network also includes at least one MSBR coupled between the New Area and the OSPF Backbone network. A third network, referred to as an "Other Area"

network includes an MSBR coupled between the Other Area network and the OSPF backbone. A mobile host (MH) data processing device may move between the three or more networks and continue to communicate with all other fixed and mobile data processing devices coupled to the networks.

A first data processing (DP) device coupled to the Home network may send a data packet to a MH data processing device which is normally associated with the Home network, but has moved to, for example, the New Area network. The data packet is sent by the first DP device to a mobility support router (MSR) located closest to the first DP device. The MSR initiates a local search to determine if the MH is currently coupled to the Home area network, and if so, the MSR sends the data packet to the MH in the Home area. If the MH is not coupled to the Home area network, the MSBR checks an internal tunnel route table for the last area (network) the MH was located in. The MSBR then notifies the MSR of the present location of the MH by a OTHER_HAS response to the MSR's WHO_HAS request. The MSR then tunnels the data packet to an MSBR coupled to the New Area in which the MH is now disposed, and the New Area MSBR tunnels the data packet to a New Area MSR. The New Area MSR then forwards the data packet to the MH. Any movement of the MH within the New Area is detected by the New Area MSBR, such that any messages sent from a New Area DP device to the MH are simply forwarded to the closest MSR in the New Area network, and need not be sent to the MSBR of the Home area, thereby optimizing routing.

In the event a DP device coupled to the Other Area network desires to send a data IP packet to the MH, the DP device coupled to the Other Area sends the data packet first to the MSBR coupled to the MH's Home area. The MSBR of the Home area checks its internal tunnel route table and determines that the MH is located in the New Area. The data packet is then tunneled to the New Area MSBR which in turn tunnels it to the New Area MSR for transmission to the MH. The Home area MSBR sends an MICP Redirect message to the MSBR for the Other Area network, such that all subsequent data packages transmitted between the DP device in the Other Area and the MH are tunneled directly from the MSBR for the Other Area to the MSBR for the New Area network, thereby again optimizing the routing.

If the MH moves to, for example the Other Area network from the New Area network, a local MSR in the Other Area to which the MH is now connecting to notifies the MSBRs of both the Home area, as well as the New Area (now the last area) that the MH came from, that the MH is currently connecting to the Other Area network. Thus, the tunnel route tables of both the Home, New Area, and Other Area MSBRs are updated, such that any data IP packets destined for the MH are sent directly to the MSBR of the Other Area network. In the event the MH moves yet again to an Other Area, the MH will inform the new local MSR of the last MSR it was connected to. The new MSR then sends a notification to the MSBRs of the last area the MH was in, as well as the present area and Home area, to permit the respective MSBRs to update their tunnel route tables. As will be described, the present invention's method and apparatus maximizes routing efficiency with minimum system overhead. Other features and advantages of the present invention are further described herein.

NOTATION AND NOMENCLATURE

Figure 1:
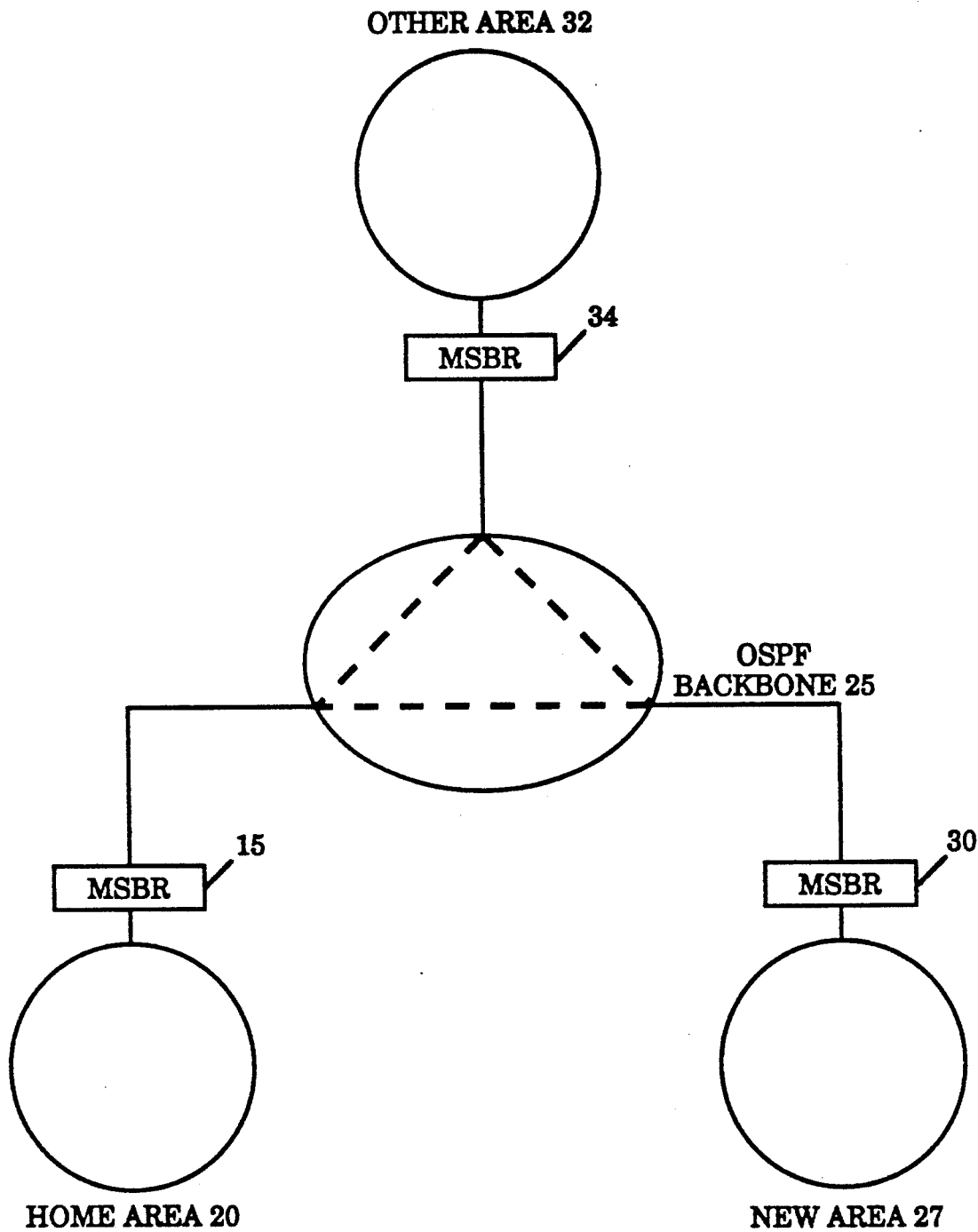
FIG. 1 is a schematic illustration of one possible network scheme using the teachings of the present invention.
Figure 2:
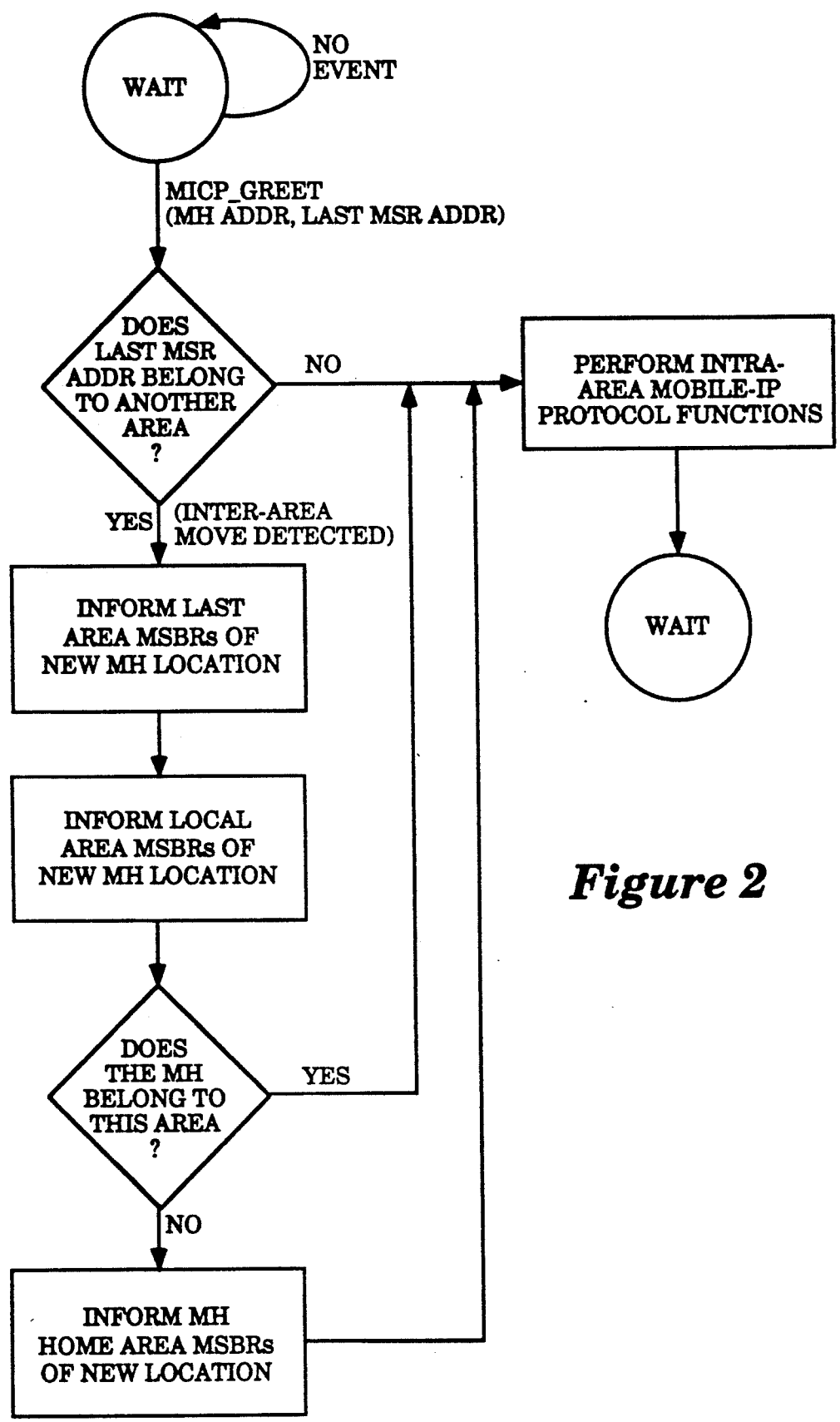
FIG. 2 is a flow chart illustrating the sequence of steps executed by a Mobility Support Router (MSR) coupled to the network configuration scheme shown in FIG. 1.

The detailed descriptions which follow are presented largely in terms of symbolic representations of operations of data processing devices coupled to a plurality of networks. These process descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities may take the form of electrical or magnetic signals capable of being stored, transferred, combined, compared, displayed and otherwise manipulated. It proves convenient at times, principally for reasons of common usage, to refer to these signals as bits, values, elements, symbols, operations, messages, terms, numbers, or the like. It should be borne in mind, however, that all of these similar terms are to be associated with the appropriate physical quantities and are merely convenient labels applied to these quantities.

In the present invention, the operations referred to are machine operations. Useful machines for performing the operations of the present invention include general purpose digital computers, or other similar devices. In all cases, the reader is advised to keep in mind the distinction between the method operations of operating a computer and the method of computation itself. The present invention relates to method steps for operating a computer, coupled to a series of networks, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method/process steps presented herein are not inherently related to any particular computer or other apparatus. Various general purpose machines may be used with programs in accordance with the teachings herein, or it may prove more convenient to construct specialized apparatus to perform the required method steps. The required structure for a variety of these machines will be apparent from the description given below.

DETAILED DESCRIPTION OF THE INVENTION

The present invention provides a scalable and efficient intra-domain tunneling mobile-IP scheme. For purposes of this description, numerous specific examples are provided such as network layouts, nodes, mobile and fixed hosts, and packet routes, in order to describe the present invention. It will be understood, however, that these specific examples and details are for illustration only and are not necessary to implement the present invention. In other instances, certain known devices, circuits and mechanisms are described in diagrammatical form only in order not to obscure the present invention with unnecessary detail. Moreover, certain terms such as "knows", "hops", "finds", etc., are used in this Specification and are considered to be terms of art. The use of these terms, which to a casual reader may be considered personifications of computer or electronic systems, refers to the functions of the system as having human like attributes, for simplicity. For example, a reference herein to an electronic system as "knowing" something is simply a shorthand method of describing that the electronic system has been programmed or otherwise modified in accordance with the teachings herein. The reader is cautioned not to confuse the functions described with everyday human attributes. These functions are machine functions in every sense.

The present invention defines campuses and routing in terms of concepts employed by hierarchical fixed-node routine protocols like OSPF. "Campus" is defined herein to be synonymous with an OSPF routing "area". This serves to limit the scope of a WHO_HAS query to a single OSPF routing area. (Since OSPF is an intra-domain routing protocol, this Specification describes intra-domain mobility only. However, it will be appreciated that the present invention may be applied to inter-domain mobility as well.)

Referring now to FIG. 1, a special form of router, termed a Mobility Support Border Router (MSBR) 15, is coupled between a Home Area network 20 and an OSPF Backbone network 25. A New Area network 27 is also coupled through an MSBR 30 to the Backbone network 25. Similarly, as illustrated, an Other Area network 32 is coupled to the Backbone network 27 through an MSBR 34.

In the presently preferred embodiment, an MSBR is similar to an OSPF Area Border Router (BR) with extra functionality to support tracking and delivery functions for inter-area mobility scenarios. This is a departure from the attempt in the Columbia scheme to not require special functionality from routers. Changing the existing network infrastructure is considered a cost prohibitive task, so schemes, such as the present invention, which can be phased in without requiring large-scale changes in existing routers are considered to be more easily implementable.

It will be appreciated by one skilled in the art that any scheme that requires special functionality in all existing routers will be difficult to phase in, considering the large number of routers in existing IP networks. However, in the present invention, special functionality for mobile units is present only in special routers, those which presently serve the BR function in OSPF. There is a much smaller number of routers that serve the BR function as compared to the total number of routers in an Autonomous system (AS). The number of routers serving the BR role scales with the number of areas in an AS, whereas the number of routers scales with the number of cables in the network. Thus, the present invention's requirement of special functionality in BR routers is not considered prohibitive, since there will always be a much smaller number of these than the total number of routers in an AS.

The present invention contemplates that the existing set of Columbia Mobile-IP protocols which perform intra-campus routing are used for intra-area mobile routing in the invention described in this Specification. A "campus" has been redefined herein to mean a routing area. The case of mobile IP routing in case of inter-area mobility will also be described. When an MH moves out of it's Home Area, the MSBRs belonging to the Home Area are notified of the MH's new location. The mechanism for performing this notification will be described in more detail below. The MSBRs of a New Area and the MSBR of the Last Area the MH was in are informed of the presence of this MH in the New Area.

Home Area To New Area

Figure 3:
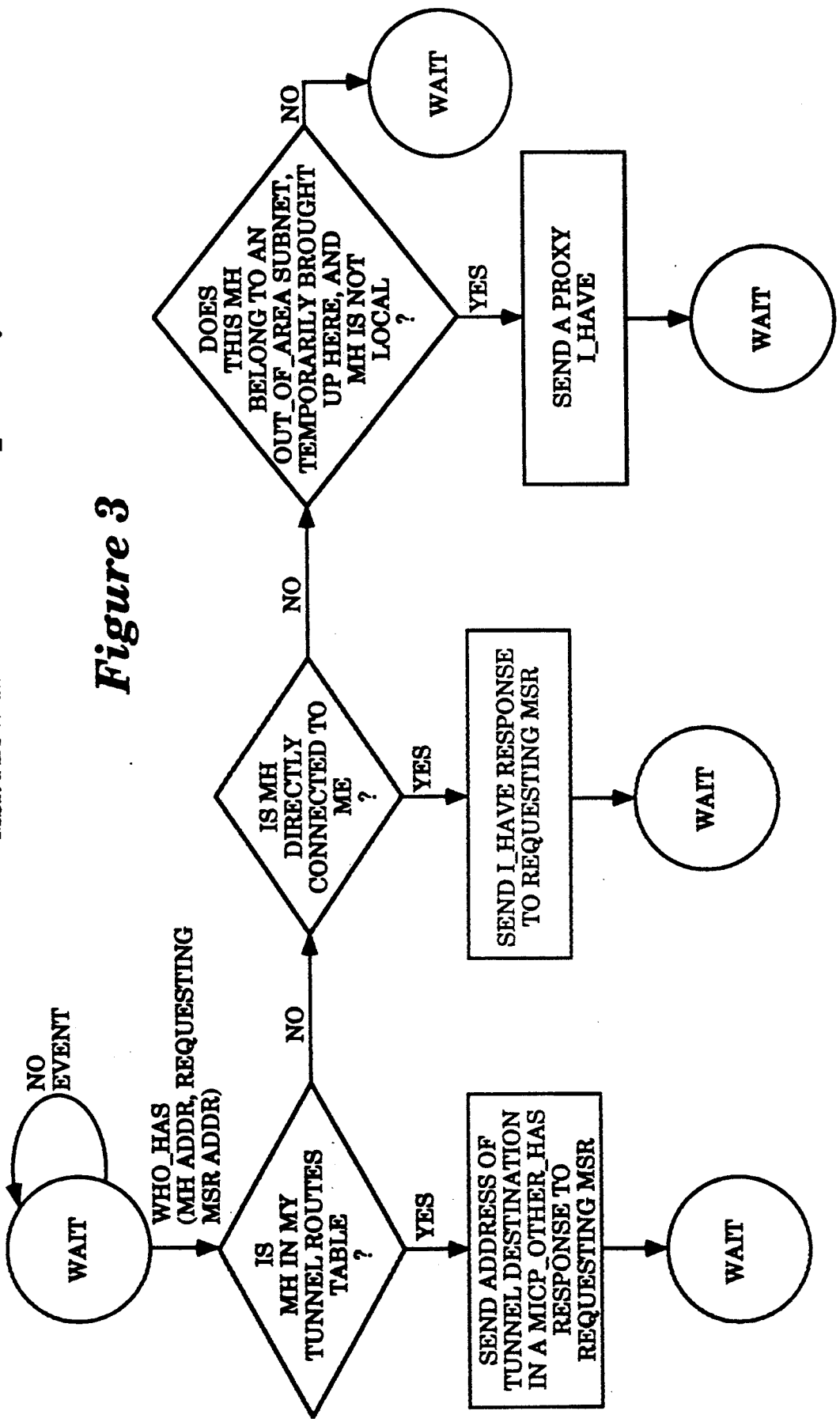
FIG. 3 is a flow chart illustrating the sequence of steps executed by a Mobility Support Boarder Router (MSBR) coupled to the network of FIG. 1 for a WHO_HAS request.
Figure 4:
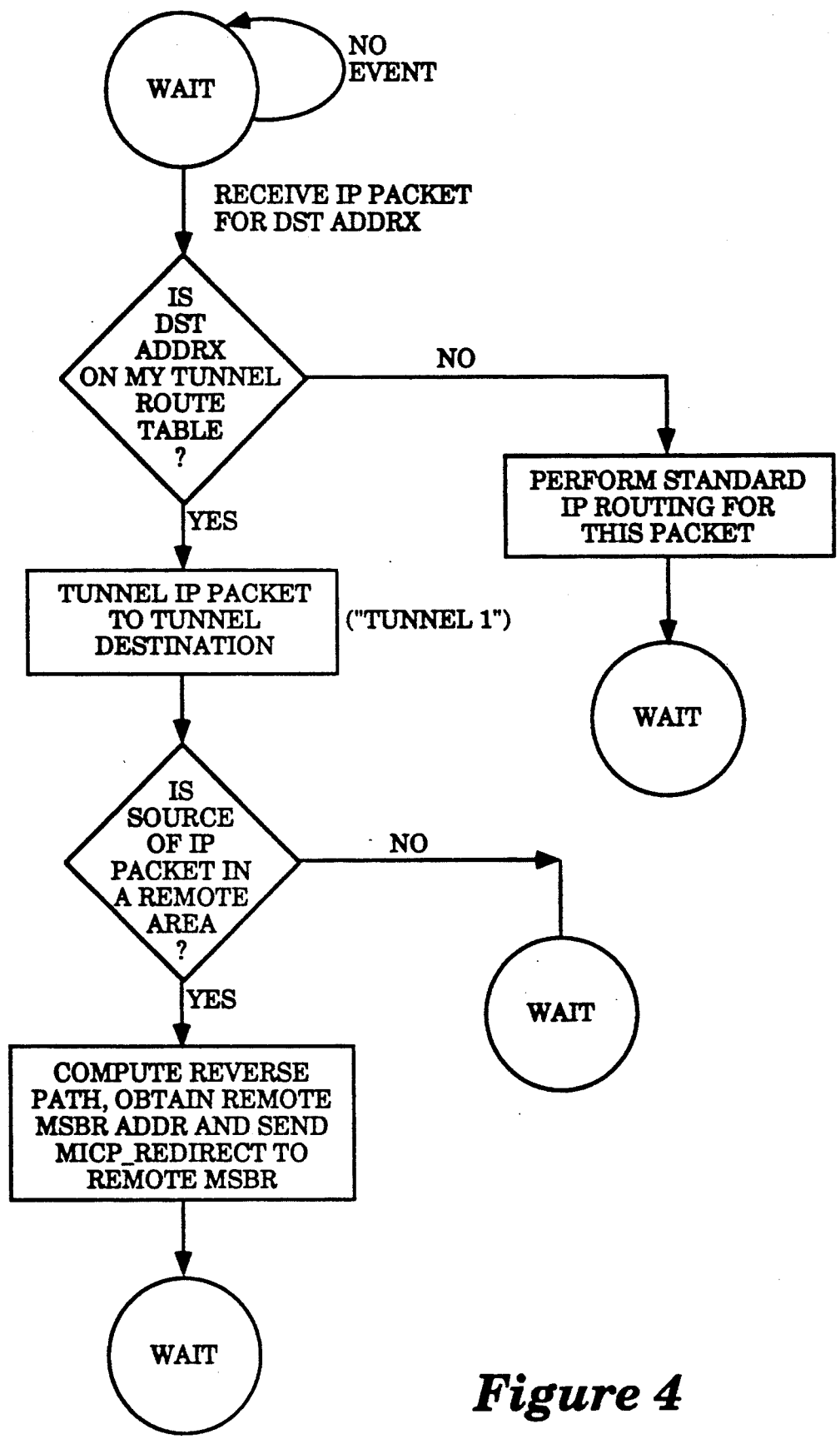
FIG. 4 is a flow chart illustrating the sequence of steps executed by a Mobility Support Border Router (MSBR) coupled to the network of FIG. 1 for the receipt of a standard IP packet.
Figure 5:
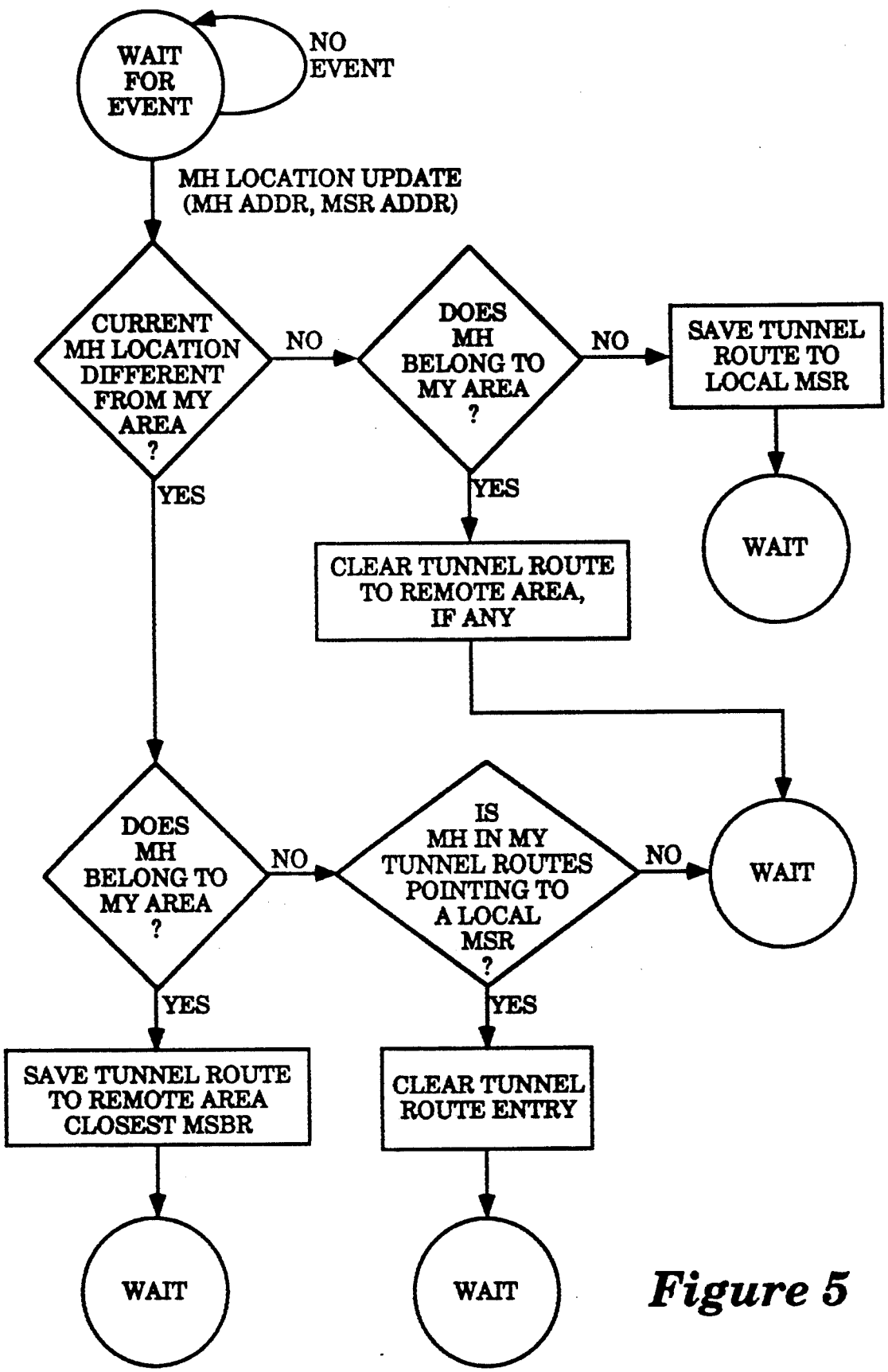
FIG. 5 is a flowchart illustrating the sequence of steps executed by a Mobility Support Border Router (MSBR) coupled to the network of FIG. 1 for the receipt of a MH location update.
Figure 6:
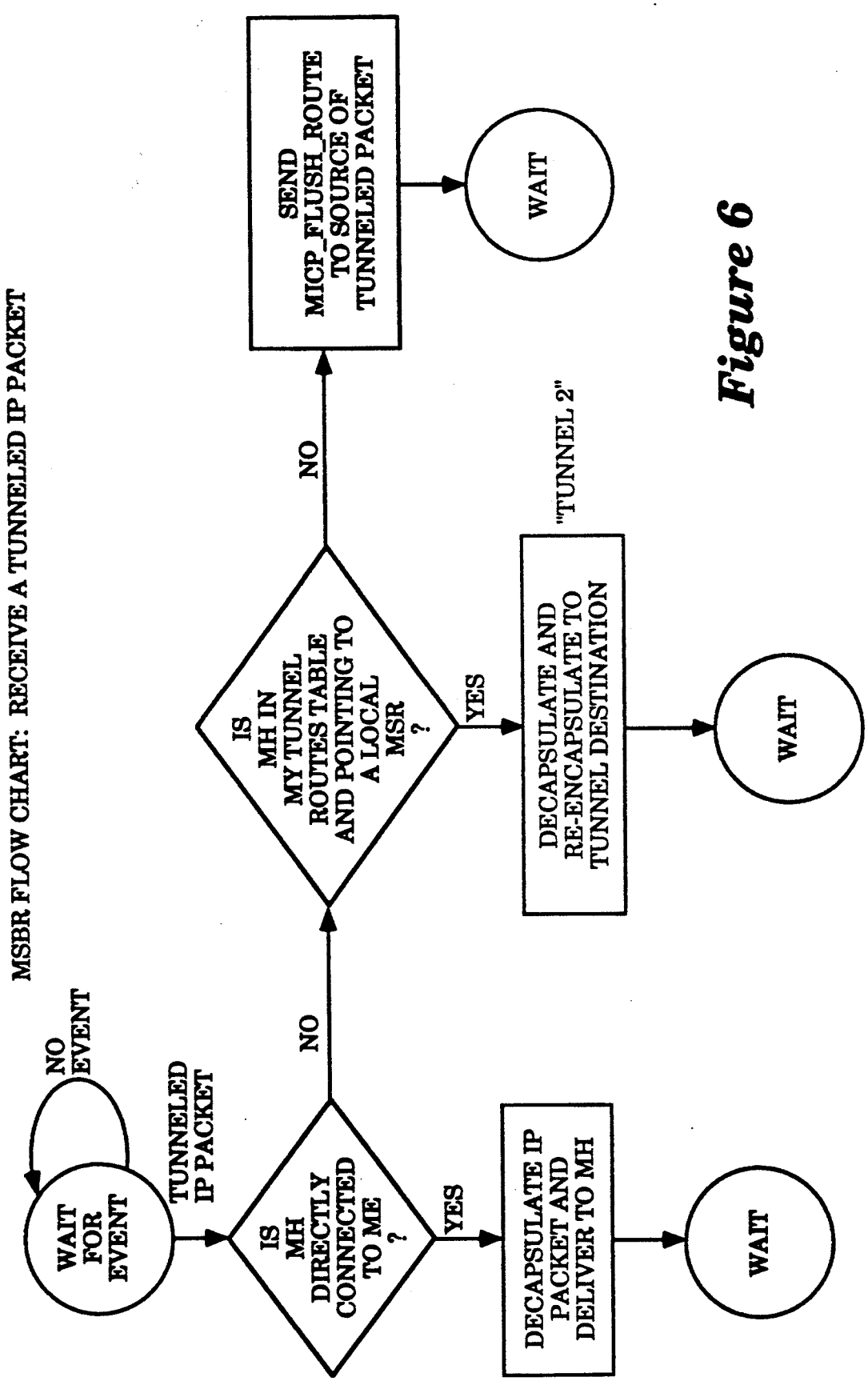
FIG. 6 is a flowchart illustrating the sequence of steps executed by a Mobility Support Boarder Router (MSBR) coupled to the network of FIG. 1 for the receipt of a tunneled IP packet.
Figure 8:
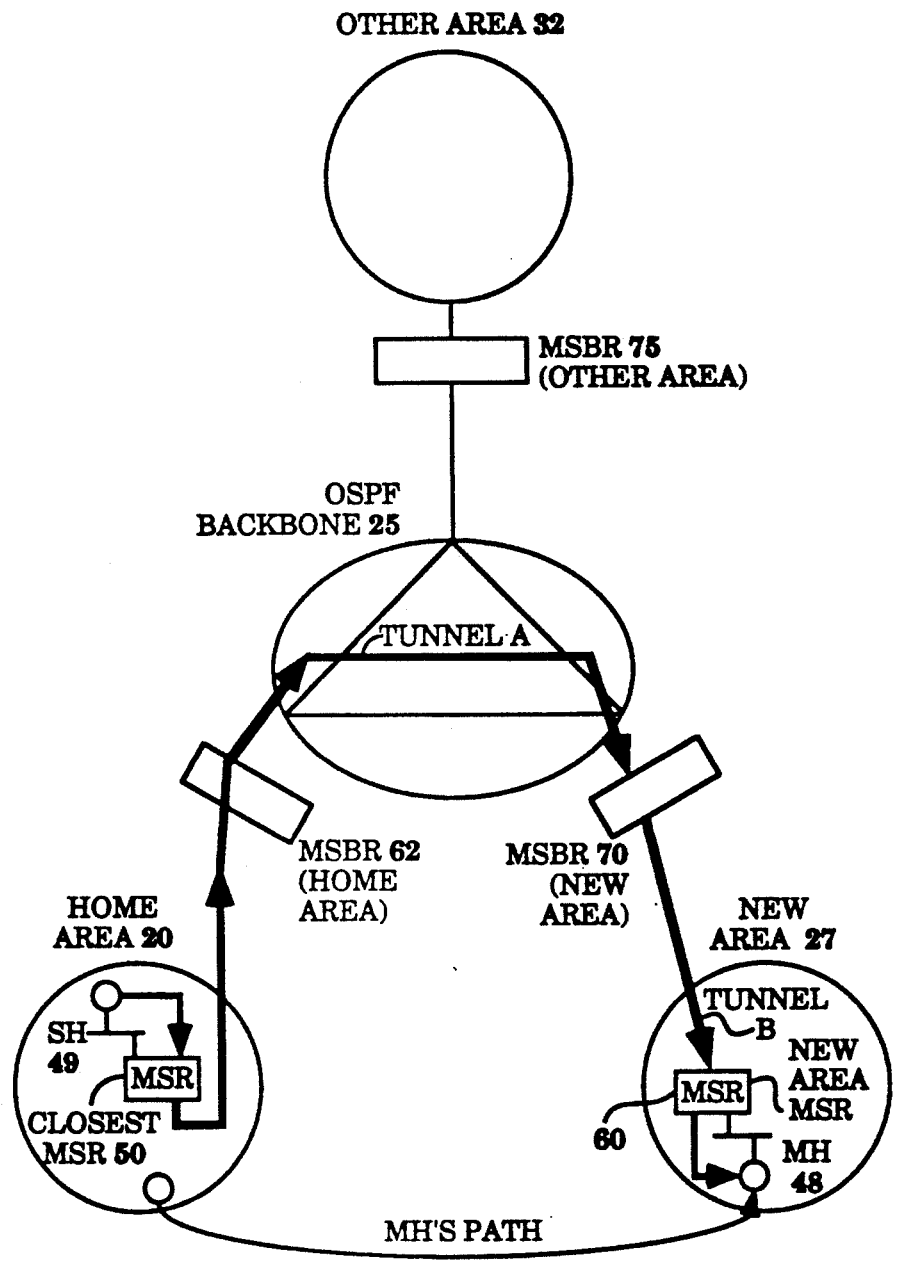
FIG. 8 conceptually illustrates a Mobile Host moving from its Home Area to a New Area in the network of FIG. 1.
Figure 8:
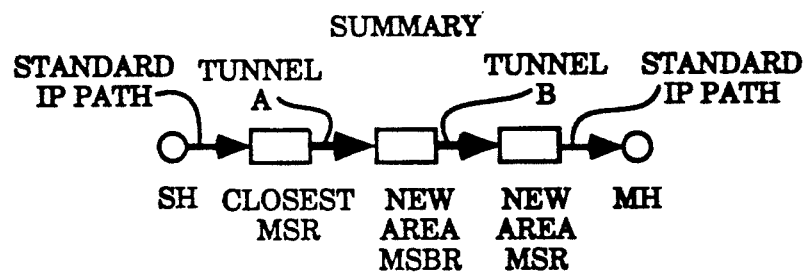

In accordance with the teachings of the present invention, the path for an IP data packet originating from an SH 49 fixed data processing device located in an MH's 48 Home Area 20, to MH's new location in New Area 27 will be described herein. As illustrated in FIG. 8, an IP packet is captured by an MSR 50 in the MH's 48 Home Area 20. An MSBR 62 checks an internal tunnel route table, and if the MH location is not in the table, the MSR 50 will attempt to locate an MSR 60 serving the MH 48 by multicasting a WHO_HAS request (See FIG. 3). This WHO_HAS request will be answered by the MSBR 62 with an OTHER_HAS response, indicating that another MSR is serving the MH 48. The address that will be delivered in this OTHER_HAS request is that of an MSBR 70 from the MH's 48 New Area 27. This action by MSBR 62 results in a tunnel (Tunnel "A") between the requesting MSR 50 and the MSBR 70 of the New Area 27. The MSBR 70 will then perform a local search for the MH 48 by doing a local WHO_HAS in case this information is not in the MSBR's 70's cache. In effect, the remote MSBR 70 is acting the role of an MSR 50 in its Home Area 20. When an MSR 60 serving the MH responds with an I_HAVE message, a tunnel (Tunnel "B") will be established between the MSR 60 and the remote MSR 50. This situation is depicted in FIG. 8, with a flow chart illustrating the steps described herein shown in FIGS. 2 through 5. As will be appreciated, the result is that there are now two tunnels concatenated back-to-back. In the drawings, the tunnel from the Home Area MSR 50 to the New Area 27 MSBR 70 is referred to as Tunnel "A", and the tunnel from the New Area MSBR 70 to the New Area MSR 60 is referred to as Tunnel "B".

The address of the New Area MSBR 70 given instead of the New Area MSR 60 to the MSBR 62 greatly facilitates mobility in the New Area 27. If the MH 48 continues to move in the New Area 27, then all that is needed are local (intra-area) transfers of control information. The New Area MSBR 70 can continue to re-tunnel the packets to the new MSRs in area 27, as appropriate. In accordance with the teachings of the present invention, there is no need to perform an update across the Backbone 25 (possibly over a wide area link) to inform the MSR in the MH's Home Area, thereby greatly reducing the overhead of maintaining up-to-date mobility related routing information in the AS.

The hierarchical aspect of the present invention may be described as follows: A first level entity (the local MSR) picks up the IP data packet and initiates a local search. The local search is answered by a local second level entity, the Home Area MSBR. The packets are sent to a remote second level entity, namely, the New Area MSBR. The remote second level entity then initiates a search in the New Area 27 and eventually sends the packet to the remote first level entity, the New Area MSR. This is analogous to how fixed-node routing is performed with the AS, except for how the routing information is disseminated. In this case, areas other than the Home Area 20 and the New Area 27, are not involved in updating/receiving control traffic. Reference is made to the flow charts of FIGS. 2–5 for a more detailed description of the process steps executed by the MSRs, MSBRs and MH.

As a matter of reference, for the reader, in IS—IS (See ISO 10589 (DIS), RFC 1142, "OSI IS—IS Intra-Domain Routing Protocol", February 1990) terminology, (the OSI Intra-domain routing protocol) the MSRs would be labeled Level-1 MSISs (Mobility Support Intermediate System) and the MSBRs would be labeled Level-2 MSISs.

Other Area to New Area

Figure 9:
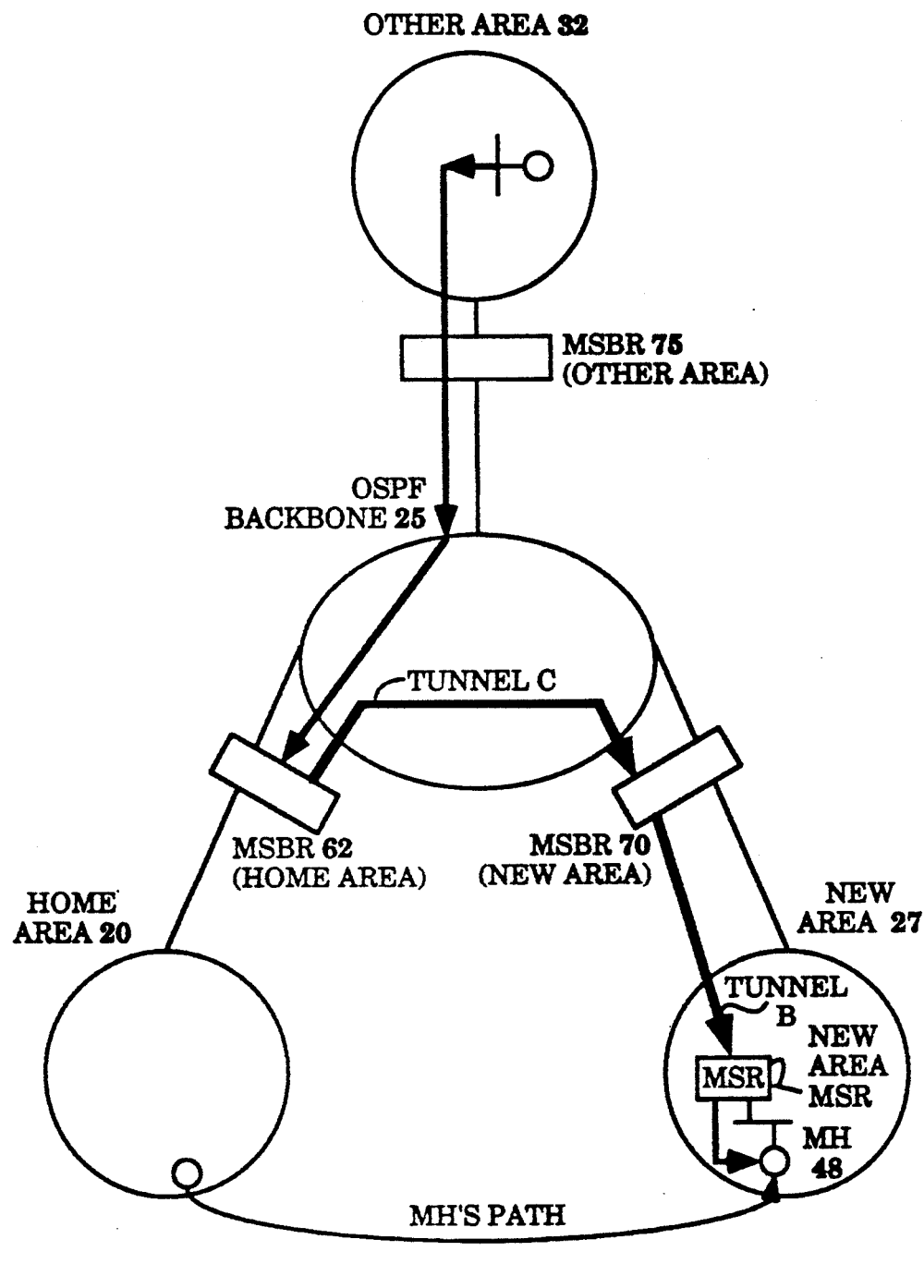
FIG. 9 conceptually illustrates the route the first IP packet takes from a Other Area to the MH which has moved to the New Area, as shown in the network of FIG. 1.
Figure 10:
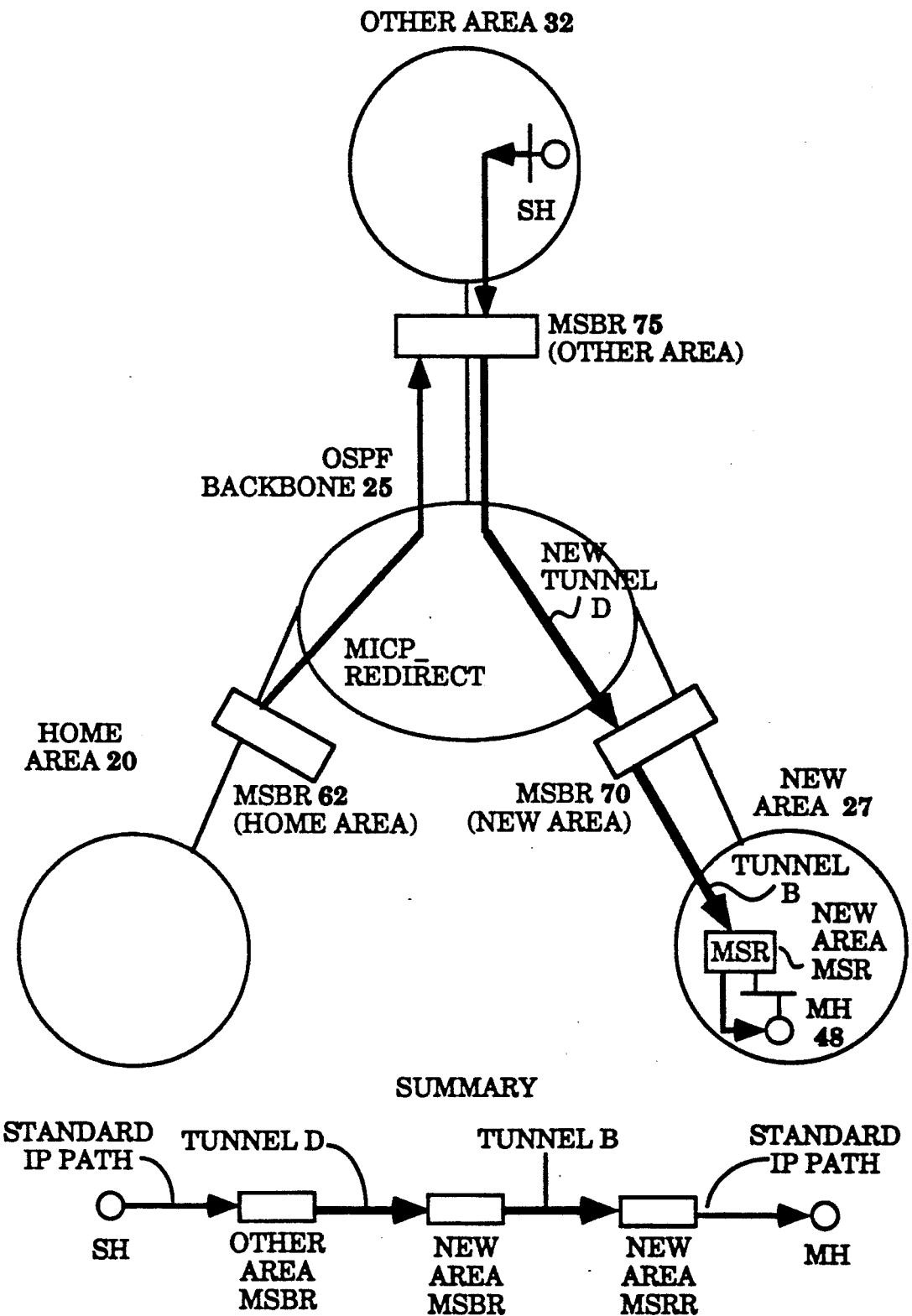
FIG. 10 conceptually illustrates the route taken by subsequent IP packets from a Other Area to the New Area MH after re-direction by the present invention.

Referring now to FIG. 9, in the case of IP data packets originating in an area other than the mobile's Home Area, the IP packet will be naturally routed towards the MH's 48 Home Area 20, since there is no information available, at least initially, to direct it otherwise. As the IP data packet reaches the MH 48's Home Area 20, it will be intercepted by one of the MSBRs (for example, MSBR 62) in the Home Area 20. Since the MSBR 62 knows of the present location of the MH 48, the capturing MSBR 62 will tunnel (Tunnel "C") the packet to the MSBR 70 of the MH's New Area. This limits the maximum suboptimality of the route that the initial packet traverses to be that of twice the diameter of the routing Backbone 25. The MH 48's Home Area MSBR 62 can, at this point, choose to update the MSBR 75 of the Other Area 32 from which the packet originated, by sending a REDIRECT packet. This REDIRECT packet contains the address of the MSBR 70 of the MH's 48 present area. The REDIRECT instructs the Other Area MSBR 75 to tunnel directly to the New Area MSBR 70 (note this is not to be confused with an ICMP Redirect). This will remove the suboptimality experienced by the initial packet for future IP packets. The route taken by subsequent IP data packets is therefore quite close to optimal using the teachings of the present invention. In case the Other Area 32 corresponds to a remote "campus", use of the REDIRECT can avoid expensive suboptimal routing over a wide area link. This situation is illustrated in FIG. 10. Tunnel "D" now directly goes from the Other Area MSBR 75 to the New Area MSBR 70, as illustrated. (Note, MICP in FIG. 10 stands for "Mobile Internetworking Control Protocol".) Reference is also made to the flowcharts of FIGS. 2–5.

It will be appreciated that use of a selective REDIRECT has the desirable effect of not flooding the Backbone 25 with unnecessary traffic. For example, if the MH 48 has moved from San Francisco to Boston and a node in London wishes to contact it, only the London MSBR is informed of the current location. MSBRs in other parts of the (possibly global) AS are not gratuitously informed. If there is no node in, say Tokyo, that wishes to reach the MH 48 no control traffic to MSBRs in Tokyo is necessary.

New Area to New Area

Figure 11:
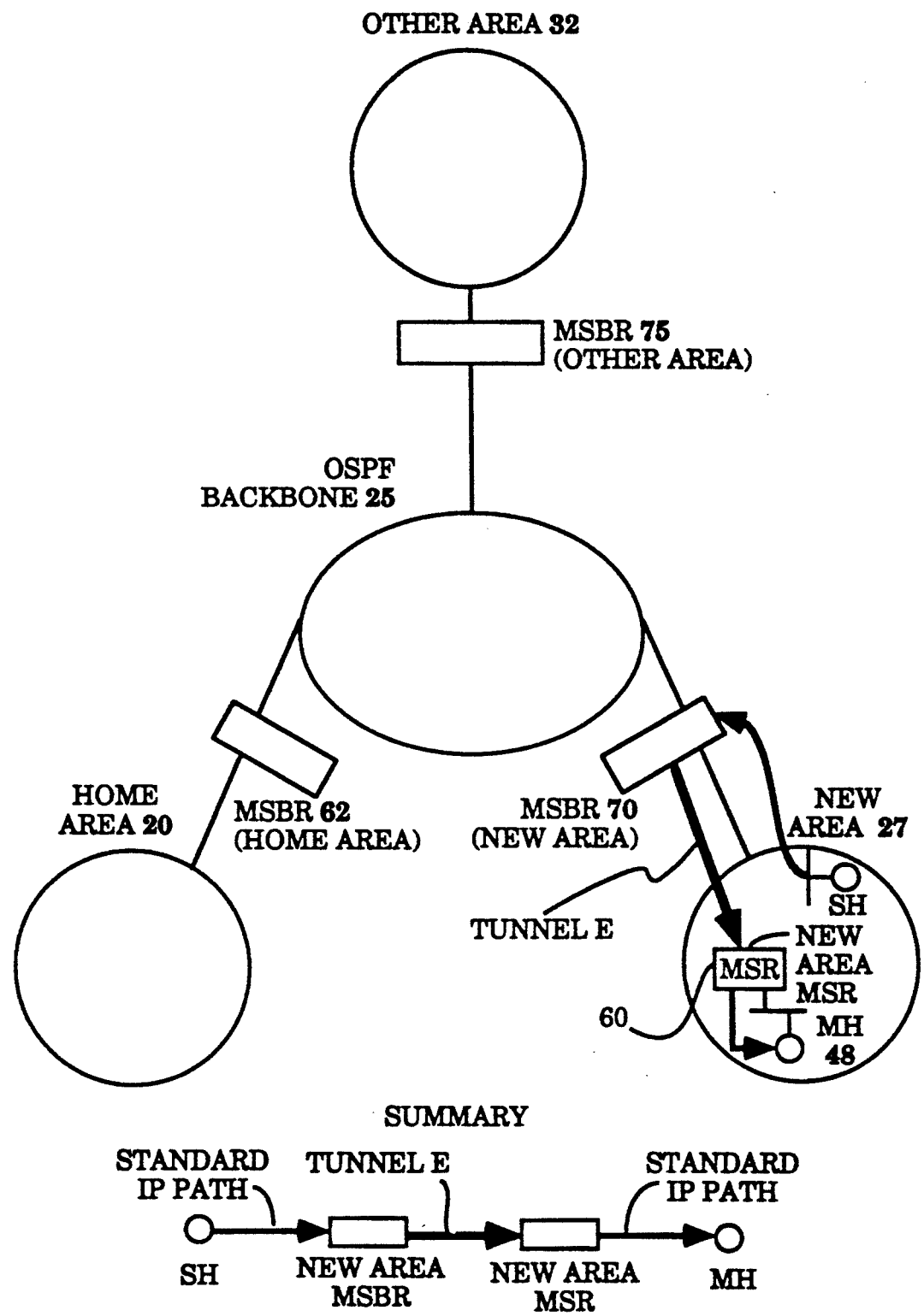
FIG. 11 conceptually illustrates the route taken by IP packets originating in the New Area intended for the MH which has moved to the New Area.

Referring now to FIG. 11, in the case where the originator of the IP packet is in the same area as the MH 48, the IP data packet will be naturally routed towards the Home Area 20 of the MH 48. However, to reach the MH's Home Area 20, the IP packet must pass through one of the MSBRs of the New Area 27 (for example, MSBR 70). MSBR 70 knows that the MH 48 is present locally, and so will tunnel (Tunnel "E") to the MSR 60 serving the MH 48. In this case, the MSBR 70 serves as a sort of packet "reflector". Doing this does not result in ideal routing, but can avoid highly sub-optimal routing because the maximal sub-optimality is equal to twice the diameter of an area and not twice the diameter of the AS, as would be the case if such a scheme was not employed. If network areas are designed properly, this avoids unnecessary packet traversals across wide area links. This situation is illustrated in FIG. 11. Since there is only one second level routing entity involved (the New Area MSBR 70), there is only one tunnel required.

Updating Mobile Host Routes in the Autonomous System

Figure 12:
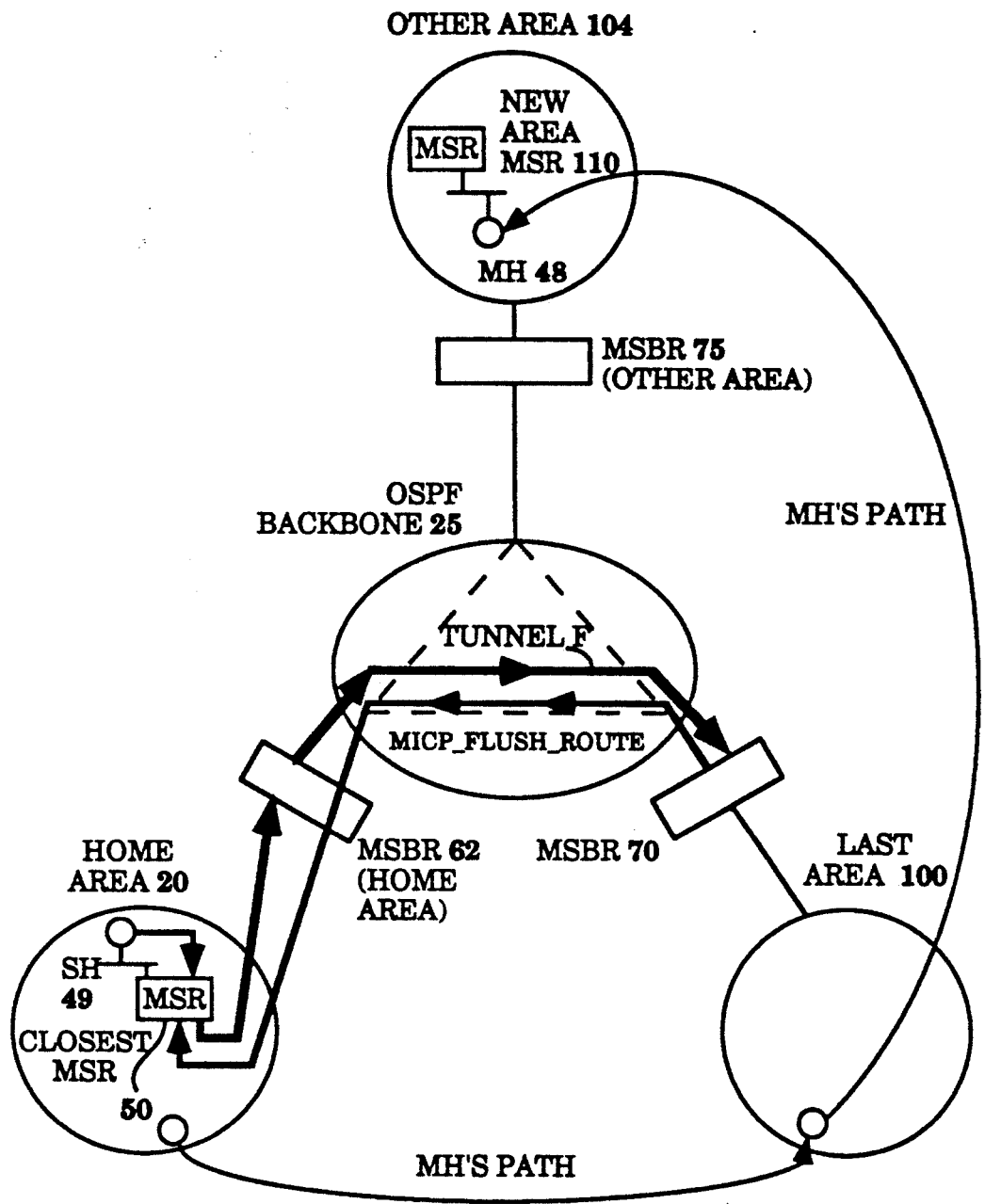
FIG. 12 illustrates an example of continued inter-area mobility using the teachings of the present invention.
Figure 12:
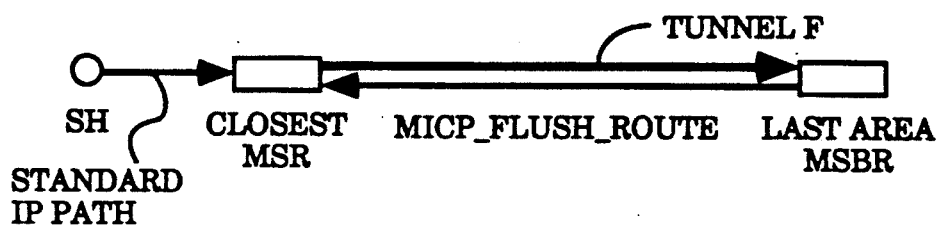

Referring now to FIG. 12, a more detailed review of the control information necessary to route packets to an inter-area mobile node is disclosed. Assume for sake of example that the MH 48 has moved from the New Area 27 to the Other Area 32. For purposes of clarity in this Specification, New Area 27 will be referred to as Last Area 100, and the Other Area 32 will be referred to as New Area 104 in this example.

When an MSR realizes that the MH 48 that is just connecting to it is from an area other than the MSR, it must inform the MSBRs of the Home Area 20 and last visited area 100 of the MH's present area (New Area 104). This can be done by either having a directory listing of the MSBRs of each area, or by sending an update notification to a special server in each area, which would then multicast to each MSBR in its area. This requires that an MSR understand the IP addresses that belong to its own area. This can be done by static configuration in case the MSR is not a "real" router (in the sense of participating in the routing algorithm).

If the MH 48 moves yet again out of the New Area to an Other Area, the MH 48 will inform the new MSR 110 as part of the connection attempt of the last MSR it was connected to. When the new MSR 110 learns that the last MSR address belongs to an area other than its own, it will inform the MSBRs of the Last Area (MSBR 70), the present area (MSBR 75) as well as the MSBRs (MSBR 62) of the MH's (48) Home Area. If the Last Area MSBR 70 continues to receive traffic for MH 48, MSBR 70 will tell the MSR at the other end of Tunnel "F" to flush its cache of this tunnel route. It will not attempt to tell the MSR 110 of the present area of the MH 48, as the Last Area MSBR 70 may be out of date. The Home Area MSBRs are always informed of inter-area moves and so they are a more reliable source of up-to-date information on the MHs belonging to them.

Figure 7:
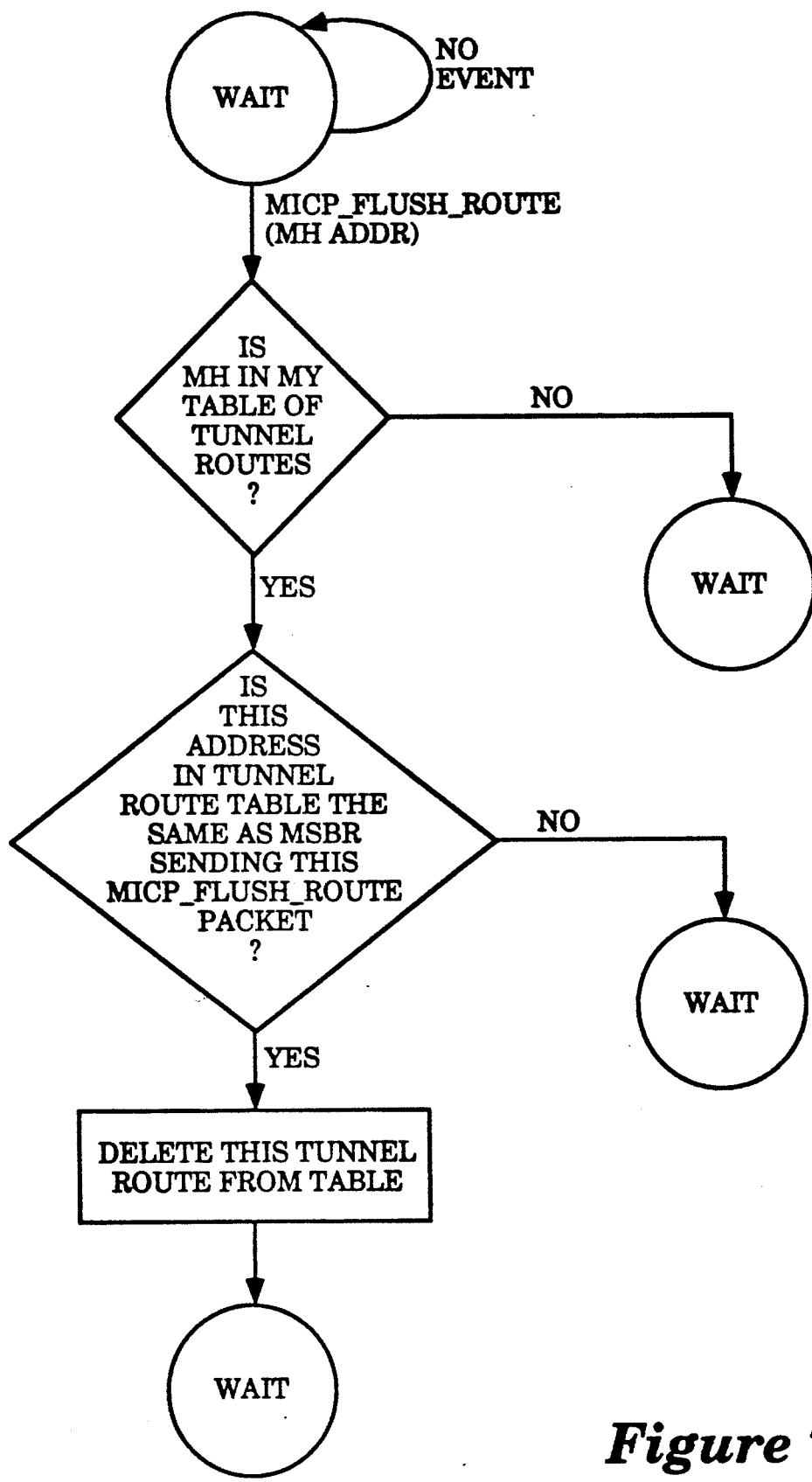
FIG. 7 is a flowchart illustrating the sequence of steps executed by a Mobility Support Router (MSR) coupled to the network of FIG. 1 for a MICP_FLUSH_ROUTE event.

It will be appreciated that informing the Tunnel "F" MSR 70 is straightforward, since all that is necessary is for the Last Area MSBR 70 to "reverse" Tunnel F, to learn the source of the packets into Tunnel F. MSBR 70 can then send a control packet (say FLUSH_ROUTE) so that the MSR 50 can perform another WHO_HAS and learn of the MH's present location. This is illustrated in FIG. 12, and the flow chart of FIG. 7.

In case the other end of Tunnel "F" is an MSBR (as in FIG. 10), the MSBR can be similarly updated with a FLUSH_ROUTE packet. Then, the MSBR can again route towards the MH 48 Home Area 20 and be notified via a REDIRECT of the present location of the MH by the Home Area MSBR 62.

Retransmissions at the transport layer will trigger the learning of the correct new location, even if some of the packets reaching old areas are dropped. The Last Area MSBR 70 may tunnel the IP packet to one of the MH's Home Area MSBRs, but this is not guaranteed to succeed because of possible temporary inconsistencies in the mobile host routes distributed in the AS.

Another factor is that there are, in general, multiple MSBRs in a given area. When the Home Area MSBRs are informed of the present area of an MH and then must send in the address of an MSBR in a OTHER_HAS or REDIRECT packet, the Home Area MSBRs will send the address of the MSBR that is closest to the entity that is being updated (either a Home Area MSR, or an Other Area MSBR). Since the MSBRs participate in the routing algorithm of the Backbone 25 and thus have a complete map of the Backbone, this should always be possible for a Home Area MSBR to accomplish.

It will also be appreciated that having a complete map of the Backbone 25 enables an MSBR to learn of the Other Area MSBR's IP address even though the source address of the IP packets does not indicate the IP addresses of the MSBRs of the source area. This is done by computing the reverse path of the IP packet until it reaches an MSBR. This is why it is not possible for the MSBR function to reside in routing entities that are not part of the Backbone 25. Only an OSPF BR has the topological information that is required to compute the point where REDIRECT packets are to be sent. A router not participating in the Backbone 25 routing algorithm simply does not know how to reverse the path to compute the address of the MSBR of the IP packet's source area.

In the event that only some of the areas have MSBR functionality, this can be learned by the routers through a special "MSBR" bit in the routing protocol. Such areas cannot then participate in optimized mobility related routes. These will then revert to the suboptimal routes of the original Columbia scheme.

It will be further noted that, even though the present description shows SH-to-MH paths, MH-to-MH communication can be derived through these paths, since an MH will transmit the packet to an MSR and from this point the SH-to-MH algorithm can be employed.

Efficiency Analysis of the Present Invention

If we denote the difference between the optimal route and the actual route traversed as the "path stretch", then the worst case path stretch using the teachings of the present invention is the maximum of twice the diameter of the Backbone 25 (see FIG. 9) or twice the diameter of an area (see FIG. 11). The worst case path stretch of the Columbia scheme is twice the diameter of the AS. The average path stretch using the present invention is even better, because at least for Other Area and Home Area to New Area situations, the path becomes quite close to optimal (see FIGS. 8 and 10). The present invention is a significant improvement in terms of worst case and average case path stretch.

The worst routing is achieved for New Area to New Area situations (although the present invention is still better than the unmodified Columbia scheme). The New Area to New Area situation can be further improved if the virtual subnet corresponding to the MH is "brought up" in the New Area, whenever an MH which has that subnet address arrives in the New Area. This would thereby enable the New Area MSRs to capture packets for that MH and then send it to the correct New Area MSR by following the local (Intra-area) algorithm. However, the New Area MSRs would also capture IP packets intended for MHs (or SHs) that are not in the New Area. In this case, the New Area MSBR closest to the MH's Home Area would have the responsibility of performing a "proxy" I_HAVE to the WHO_HAS request for out-of-area MHs (or SHs). Since the New Area MSBRs know which MH's are in the New Area, the New Area MSBRs can detect when to perform this proxy I_HAVE. Upon receiving the data packets, the New Area MSBR sends the IP packets towards the MH Home Area, using the standard IP inter-area routing mechanisms. The efficiency of the New Area to New Area routes are, therefore, the same as that of the intra-area (home to home) mobile routes.

It will be further appreciated that there is a trade-off in the amount of network bandwidth used by the control traffic in bringing up the new virtual subnet and the network bandwidth wasted because of suboptimal New Area to New Area data packet routing. If there is a minimal amount of New Area to New Area data traffic, then taking this step would likely not be justified. However, if there is a large amount of data traffic originating in the New Area for the MH, then the savings in overall bandwidth consumption due to the sum of the control and data traffic may well justify taking this step in accordance with the teachings of the present invention.

It should be emphasized that this virtual subnet "bring-up" would only be for the purposes of mobile routing. The New Area will not dynamically include ranges of IP addresses for the purpose of identifying that area. Specifically, only the mobile's Home Area would need to list that subnet number as part of the range of IP addresses that belong to it. In other words, the effect of the virtual subnet bring-up would have to be contained in the New Area, and may be accomplished by the MSBRs not propagating this information beyond the area to which they belong.

Another aspect of efficiency in the present invention is the storage requirement of the tunnel routes at an MSBR. These storage requirements scale with the number of external inter-area mobile nodes present in the MSBR's own area plus the number of inter-area mobile nodes that have that area as their Home Area. MSBRs are not required to know about all the inter-area mobile nodes of the entire AS. Selective updates thus have the benefit of reducing both the bandwidth utilization of the network due to control traffic and the storage requirements of tunnel routes at MSBRs.

Summary

The present invention has described a system that has the advantages of tunneling (better handling by existing hosts and routers) with the scalability of a hierarchical scheme. A special entity referred to as an MSBR that serves as the second level of the mobile routing and tracking hierarchy is disclosed. The use of path reversal techniques to update active communication paths, thereby serving to minimize expensive wide area traffic due to mobility related control information is also described. Specifically, flooding is avoided in order to disseminate mobility related routing information. Furthermore, hierarchical two-level tunneling and communication between MSBRs optimize the bulk of the routes taken by data packets by avoiding unnecessary use of wide area Backbone communication links.

While the present invention has been described with reference to FIGS. 1-12, it will be appreciated that the figures are for illustration only, and are not to be taken as limitations on the present invention.

I claim:

1. In a first network and a second network coupled to communicate together, said first network including a first host data processing (DP) device and a mobile host (MH) data processing device, a system for said first data processing device to communicate with said mobile host data processing device once said mobile host data processing device is moved to and in communication with said second network, comprising:

a first mobility support border router (MSBR) and a first mobility support router (MSR) coupled to said first network;

a second MSBR and a second MSR coupled to said second network;

said first host DP device sending a data packet to said first MSR coupled to said first network, said first MSR initiating a local search on said first network to determine if said MH data processing device is coupled to said first network;

said first MSBR notifying said first MSR that said MH data processing device is not coupled to said first network and instructing said first MSR to tunnel said data packet destined for said MH, to said second MSBR;

said second MSBR receiving said data packet and initiating a search on said second network to determine if said MH data processing device is in communication with said second network, and if said MH is located on said second network, said second MSBR tunneling said data packet to said second MSR and said second MSR sending said data packet to said MH data processing device.

2. The system as defined by claim 1 further including a third network coupled to communicate with said first and second networks, said third network including a third MSBR and a third MSR coupled to said third network.

3. The system as defined by claim 2 wherein in the event a second host DP device coupled to said third network desires to send a second message packet to said MH, said second message packet is received by said first MSBR and tunneled to said second MSBR, said second MSBR receiving said second message packet and tunneling said second message packet to said second MSR, said second MSR sending said second data packet to said MH data processing device.

4. The system as defined by claim 3 wherein subsequent to receipt of said second data packet said first MSBR sends a REDIRECT message to said third MSBR, such that all subsequent data packets sent from DP devices coupled to said third network are tunneled directly from said third MSBR to said second MSBR to be tunneled to said MH data processing device coupled to said second network.

5. The system as defined by claim 1 wherein in the event a second host DP device coupled to said second network desires to send a second data packet to said MH, said second DP device sends said second data packet to said second MSBR, said second MSBR tunneling said second data packet to said second MSR for transmission to said MH.

6. The system as defined by claim 2 wherein in the event said MH data processing device is moved from said second network to said third network, said third MSR sends an update message to said first, second and third MSBRs notifying said MSBRs that said MH is currently coupled to said third network, such that future data packets sent from DP devices coupled on said first, second and third networks destined for said MH data processing device are tunneled to said third MSBR for tunneling to said third MSR and then to said MH.

7. The system as defined by claim 6 further including a forth network coupled to communicate with said first, second, and third networks, said forth network having a forth MSBR and a forth MSR.

8. The system as defined by claim 7 wherein if said MH data processing device is moved and coupled to said forth network, said MH sending a last location message to said forth MSR, said forth MSR notifying said forth, third, second and first MSBRs that said MH is now coupled to said forth network.

9. The system as defined by claim 8 wherein in the event said third MSBR continues to receive data packets from a MSR which are destined for said MH, said third MSBR sends a control packet MICP_FLUSH_ROUTE to the MSR sending said data packet.

10. In a system having a first network and a second network coupled to communicate together, said first network including a first host data processing (DP) device and a mobile host (MH) data processing device, a method for said first data processing device to communicate with said mobile host data processing device once said mobile host data processing device is moved to and in communication with said second network, comprising the steps of:

(a) providing a first mobility support border router (MSBR) and at least one first mobility support router (MSR) coupled to said Home area network;

(b) providing a second MSBR and at least one second MSR coupled to said New Area network, said second MSR being the closest MSR to said MH data processing device coupled to said New Area network;

(c) said first host data processing device sending a data packet to said first MSR coupled to said Home area network, said first MSR initiating a local search on said Home area network to determine if said mobile host data processing device is coupled to said Home area network;

(d) said first MSBR notifying said first MSR that said MH data processing device is out of the Home area network and instructing said first MSR to tunnel said data packet destined for said MH;

(e) said second MSBR receiving said data packet and initiating a search on said New Area network to determine if said MH data processing device is in communication with said New Area network, and if said MH is located, said second MSBR tunneling said data packet to said second MSR and said second MSR sending said data packet to said MH data processing device.

11. The method as defined by claim 10 further including a third network coupled to communicate with said first and second networks, said third network including a third MSBR and a third MSR coupled to said third network.

12. The method as defined by claim 11 further including the step of a second host DP device coupled to said third network sending a second message packet to said MH, said second message packet being received by said first MSBR and tunneled to said second MSBR, said second MSBR receiving said second message packet and tunneling said second message packet to said second MSR, said second MSR sending said second data packet to said MH data processing device.

13. The method as defined by claim 12 further including the step of subsequent to receipt of said second data packet said first MSBR sending a REDIRECT message to said third MSBR, such that all subsequent data packets sent from DP devices coupled to said third network are tunneled directly from said third MSBR to said second MSBR to be forwarded to said MH data processing device coupled to said second network.

14. The method as defined by claim 10 further including the step of a second host DP device coupled to said second network sending a second data packet to said MH, said second DP device sending said second data packet to said second MSBR, said second MSBR tunneling said second data packet to said second MSR for transmission to said MH.

15. The method as defined by claim 11 further including the step of moving said MH data processing device from said second network to said third network, said third MSR sending an update message to said first, second and third MSBRs notifying said MSBRs that said MH is currently coupled to said third network, such that future data packets sent from DP devices coupled on said first, second and third networks destined for said MH data processing device are sent to said third MSBR for tunneling to said third MSR and then to said MH.

16. The method as defined by claim 15 further including a forth network coupled to communicate with said first, second, and third networks, said forth network having a forth MSBR and a forth MSR.

17. The method as defined by claim 16 further including the step of moving said MH data processing device to said forth network, said MH sending a last location message to said forth MSR, said forth MSR notifying said forth, third, second and first MSBRs that said MH is now coupled to said forth network.

18. The method as defined by claim 17 further including the step that if said third MSBR continues to receive data packets from a MSR which are destined for said MH, said third MSBR sends a control packet MICP_FLUSH_ROUTE to the MSR sending said data packet.

* * * * *